US012713341B2

(12) United States Patent
Qu

(10) Patent No.: US 12,713,341 B2
(45) Date of Patent: Aug. 18, 2026

(54) METHODS AND APPARATUSES FOR INTEGRATING SENSING AND COMMUNICATION BY APPLYING CARRIER AGGREGATION AND SCELL DORMANCY BEHAVIOR

(71) Applicant: MEDIATEK SINGAPORE PTE. LTD., Singapore (SG)

(72) Inventor: Wenze Qu, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/333,137

(22) Filed: Jun. 12, 2023

(65) Prior Publication Data

US 2024/0284322 A1 Aug. 22, 2024

(30) Foreign Application Priority Data

Feb. 21, 2023 (CN) ......................... 202310188259.2

(51) Int. Cl.
*H04W 52/02* (2009.01)
*H04L 5/00* (2006.01)
*H04W 72/23* (2023.01)

(52) U.S. Cl.
CPC ......... *H04W 52/0206* (2013.01); *H04L 5/001* (2013.01); *H04L 5/0098* (2013.01); *H04W 72/23* (2023.01)

(58) Field of Classification Search
CPC .. H04W 52/0206; H04W 72/23; H04L 5/001; H04L 5/0098
USPC .......................................................... 370/328
See application file for complete search history.

(56) References Cited

U.S. PATENT DOCUMENTS

| | | | | |
|---|---|---|---|---|
| 11,502,891 | B2 * | 11/2022 | Choi | H04L 5/0048 |
| 2017/0005775 | A1 * | 1/2017 | Cheng | H04W 76/15 |
| 2019/0173648 | A1 * | 6/2019 | Wang | H04L 1/0038 |
| 2019/0230656 | A1 * | 7/2019 | Soriaga | H04L 1/1896 |
| 2019/0254110 | A1 * | 8/2019 | He | H04L 5/0048 |
| 2019/0363843 | A1 | 11/2019 | Gordaychik | H04L 1/100 |
| 2020/0267730 | A1 * | 8/2020 | Kim | H04W 72/0453 |
| 2021/0036741 | A1 * | 2/2021 | Park | H04B 7/0404 |
| 2021/0050987 | A1 * | 2/2021 | Hsieh | H04W 72/23 |

(Continued)

OTHER PUBLICATIONS

Taiwan Intellectual Property Office Action 112122408, dated Apr. 29, 2024.

(Continued)

*Primary Examiner* — Mark G. Pannell
(74) *Attorney, Agent, or Firm* — Helen Mao; Imperium Patent Works

(57) ABSTRACT

A method is proposed for integrating sensing and communication. For example, the method can include receiving sensing-related information of a sensing task and communication-related information of a communication task. The method can also include determining, based on the sensing-related information and the communication-related information, frequency-related information, time-related information and one or more sensing signals. The method can also include sending the frequency-related information, time-related information and one or more sensing signals, for an apparatus to perform the sensing task and the communication task by applying carrier aggregation (CA) and secondary cell (SCell) dormancy behavior.

20 Claims, 10 Drawing Sheets

(56) References Cited

U.S. PATENT DOCUMENTS

| | | | | |
|---|---|---|---|---|
| 2021/0250115 | A1* | 8/2021 | Harada | H04J 11/0086 |
| 2023/0017408 | A1* | 1/2023 | Levitsky | H04L 5/0048 |
| 2023/0155864 | A1* | 5/2023 | Abdoli | H04L 25/0204<br>370/329 |
| 2023/0362990 | A1* | 11/2023 | Jang | H04L 5/003 |
| 2025/0119883 | A1* | 4/2025 | Liang | H04B 17/309 |
| 2025/0193911 | A1* | 6/2025 | Jang | H04W 72/21 |
| 2025/0212235 | A1* | 6/2025 | Huang | G01S 13/003 |
| 2026/0005810 | A1* | 1/2026 | Nammi | H04B 7/0626 |
| 2026/0052489 | A1* | 2/2026 | Myung | H04J 11/0079 |

OTHER PUBLICATIONS

3GPP Technical Specification Group TSG SA; Feasibility Study on Integrated Sensing and Communication (Release 19) 3GPP Dec. 2, 2022 https://www.3gpp.org/ftp/Specs/archive/22_series/22.837/22837-030.zip.

Zhiqing Wei; Hanyang Qu; Yuan Wang; Xin Yuan; Huici Wu; Ying Du; Kaifeng Han; Ning Zhang; Zhiyong Feng Integrated Sensing and Communication SignalsToward 5G-A and 6G: A Survey IEEE Jan. 9, 2023 https://ieeexplore.ieee.org/document/10012421.

* cited by examiner

METHODS AND APPARATUSES FOR INTEGRATING SENSING AND COMMUNICATION BY APPLYING CARRIER AGGREGATION AND SCELL DORMANCY BEHAVIOR

CROSS-REFERENCE TO RELATED APPLICATIONS

This present application claims the priority of Chinese Application No. 202310188259.2, filed on Feb. 21, 2023, which is incorporated herein by reference in its entirety.

TECHNICAL FIELD

The present disclosure relates to wireless communications, and, more particularly, to methods and apparatuses for integrating sensing and communication (ISAC) by applying carrier aggregation (CA) and secondary cell (SCell) dormancy behavior.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

With rapid development in wireless communication technologies, mobile communication systems have evolved across generations, e.g., Long-Term Evolution (LTE), LTE-Advanced (LTE-A), New Radio (NR), and Next Generation wireless networks such as beyond 5G (B5G) and 6G. Accordingly, a variety of techniques have been introduced to LTE, LTE-A, NR, B5G and 6G systems. For example, in 6G mobile communication systems higher frequency bands, wider bandwidth and massive antenna arrays can be used to enable high-accuracy and high-resolution sensing, which can help integrate sensing and communication (ISAC) in a single system.

To meet the explosive growth in traffic demand, a variety of techniques have been introduced to LTE, LTE-A and NR systems, including carrier aggregation (CA). In CA, two or more carriers (referred to as component carriers (CCs)) can be aggregated to provide a wide bandwidth. These CCs can include one primary CC (PCC) and one or more secondary CCs (SCCs), and can be organized into multiple cells, including one primary cell (PCell) associated with the PCC and one or more secondary cells (SCells) associated with the SCCs. The PCell is always activated, while the SCells can be activated or deactivated. The activation and the deactivation are done via media access control (MAC) control element (CE).

Inefficient energy consumption leads to poor user experience. NR radio access technology improves battery efficiency and achieves power savings through a variety of techniques, such as bandwidth part (BWP) switching, cross-slot scheduling, maximum layer switching, and secondary cell (SCell) dormancy technique.

SUMMARY

Aspects of the present disclosure provide a method for integrating sensing and communication. For example, the method can include receiving sensing-related information of a sensing task and communication-related information of a communication task. The method can also include determining, based on the sensing-related information and the communication-related information, frequency-related information, time-related information and one or more sensing signals. The method can also include sending the frequency-related information, time-related information and one or more sensing signals, for an apparatus to perform the sensing task and the communication task by applying carrier aggregation (CA) and secondary cell (SCell) dormancy behavior.

In an embodiment, the sensing-related information can include range resolution and a sensing schedule of the sensing task. In another embodiment, the communication-related information can include a data rate of signals that the apparatus transmit in the communication task.

In an embodiment, the frequency-related information can include a bandwidth, a number of component carriers (CCs), and identities of the CCs (CC IDs) on which the apparatus performs the sensing task and the communication task, and the time-related information includes an activation/deactivation schedule of one or more SCells including the CCs. In another embodiment, the time-related information can further include an active/dormancy behavior transition schedule of the SCells.

In an embodiment, the one or more sensing signals can include at least one of a demodulation reference signal (DMRS), a synchronization signal block (SSB) signal and a channel state information reference signal (CSI-RS). In another embodiment, the one or more sensing signals can further include a chirp signal. In some embodiment, the one or more sensing signals can further include at least one of a sounding reference signal (SRS) and a random access channel (RACH) signal.

Aspects of the present disclosure further provide a method for integrating sensing and communication by applying carrier aggregation (CA) and secondary cell (SCell) dormancy behavior. For example, the method can include receiving frequency-related information, time-related information and one or more sensing signals that are determined bases on sensing-related information of a sensing task and communication-related information of a communication task, for an apparatus to perform the sensing task and the communication task by applying CA and SCell dormancy behavior. The method can also include activating and/or deactivating one or more SCells including one or more component carriers (CCs) based on the frequency-related information. The method can also include transitioning the activated SCell between a dormancy behavior and an active behavior based on the time-related information. The method can also include performing the sensing task by using the sensing signals on the activated SCell that is transitioned from the dormancy behavior to the active behavior, and performing the communication task on a primary Cell (PCell) including a primary component carrier (PCC).

In an embodiment, the method can further include receiving a sensing report configuration. In another embodiment, the method can further include reporting a sensing result of the sensing task.

Aspects of the present disclose also provide apparatus, which can include circuitry configured to: receive frequency-related information, time-related information and one or more sensing signals that are determined bases on sensing-related information of a sensing task and communication-related information of a communication task, for the apparatus to perform the sensing task and the communication task by applying carrier aggregation (CA) and secondary cell (SCell) dormancy behavior; activate and/or deactivate one or more SCells including one or more component carriers (CCs) based on the frequency-related information; transition the activated SCell between a dormancy behavior and an active behavior based on the time-related information; perform the sensing task by using the sensing signals on the activated SCell with the active behavior; and perform the communication task on a primary Cell (PCell) including a primary component carrier (PCC).

Note that this summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the present disclosure and embodiments, the reader is directed to the Detailed Description section and corresponding figures of the present disclosure as further discussed below.

BRIEF DESCRIPTION OF THE DRAWINGS

Aspects of the present disclosure can be understood from the following detailed description when read with the accompanying figures. It is noted that, in accordance with the standard practice in the industry, various features are not drawn to scale. In fact, the dimensions of the various features may be increased or reduced for clarity of discussion.

DETAILED DESCRIPTION

Figure 1:
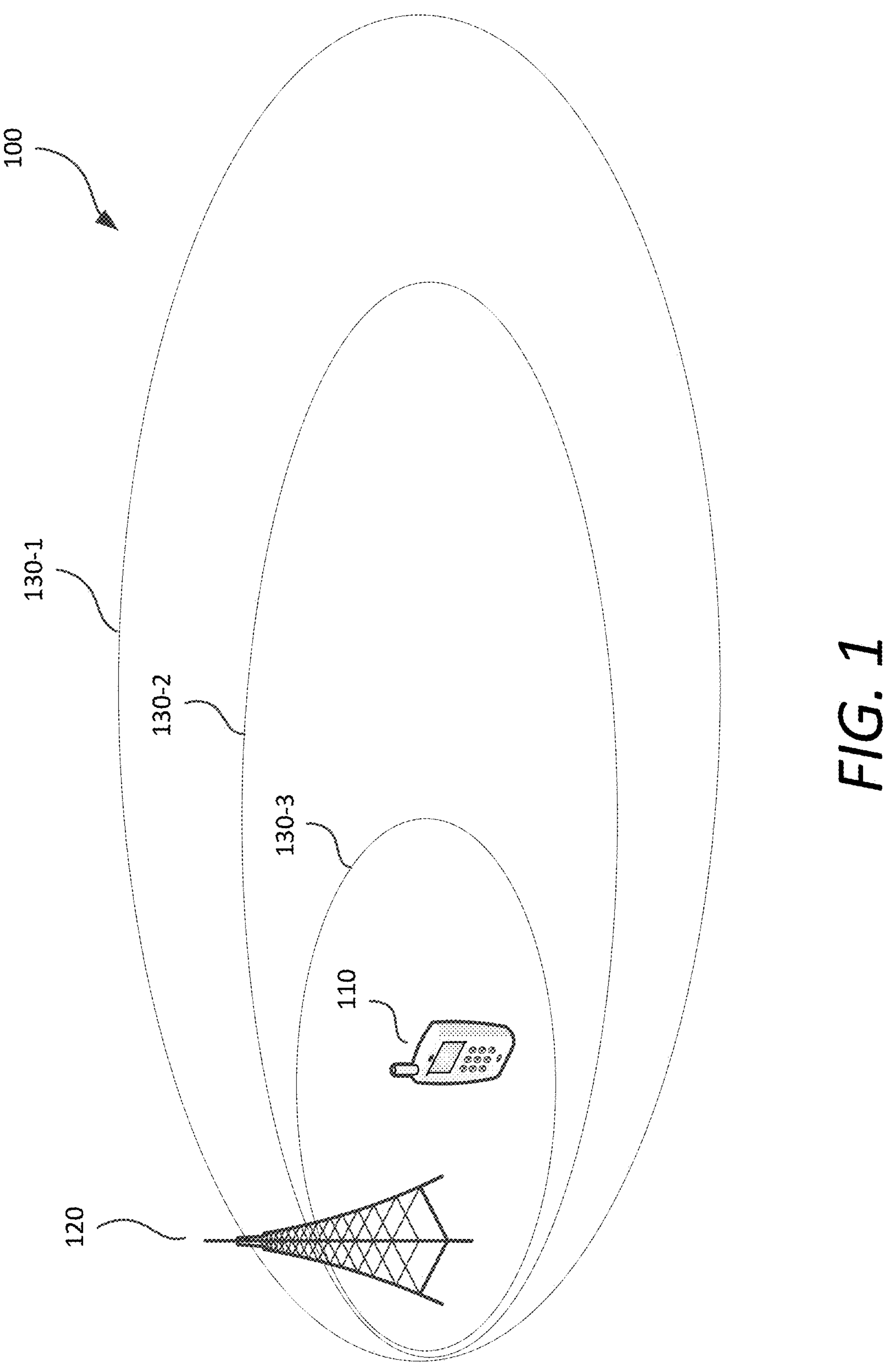
FIG. 1 shows a wireless communication system according to some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features may be in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure or characteristic in connection with other embodiments whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for existence of additional factors not necessarily expressly described, again, depending at least in part on context.

It should be readily understood that the meaning of "on," "above," and "over" in the present disclosure should be interpreted in the broadest manner such that "on" not only means "directly on" something, but also includes the meaning of "on" something with an intermediate feature or a layer therebetween. Moreover, "above" or "over" not only means "above" or "over" something, but can also include the meaning it is "above" or "over" something with no intermediate feature or layer therebetween (i.e., directly on something).

Further, spatially relative terms, such as "beneath," "below," "lower," "above," "upper," and the like, can be used herein for ease of description to describe one element or feature's relationship to another element(s) or feature(s) as illustrated in the figures. The spatially relative terms are intended to encompass different orientations of the device in use or process step in addition to the orientation depicted in the figures. The apparatus can be otherwise oriented (rotated 90 degrees or at other orientations) and the spatially relative descriptors used herein can likewise be interpreted accordingly.

Beyond 5G (B5G) and 6G will serve as a distributed neural network (NN) for the future intelligence of Everything. For example, 6G will integrate sensing and communication (ISAC) in a single system. For the sensing aspects, the radio signals transmitted and received by communications network elements and the radio wave transmission, reflections, and scattering can be used to sense in order to perceive the surrounding environment. In practice, the ISAC-enabled Internet of Things (IoT) has shown great potential in daily activity recognition, daily health care, home security, driver attention monitoring, etc. For example, amplitudes and phases in wireless signals may be affected by objects (e.g., human, vehicle, rain, etc.) or movements of the objects (e.g., moving human, running vehicle and falling rain) in an environment, and the variations of the amplitudes and phases can be used for various sensing tasks, including detection, estimation and recognition, such as detecting or recognizing human presence, proximity, falls, gestures, breathing (e.g., chest movement), heartbeat displacement, etc., passive object detection and tracking, people/passenger counting, as well as imaging and environment reconstruction. Therefore, communication performance can be improved, such as more accurate beamforming, faster beam failure recovery and less overhead when tracking the channel state information (CSI), with the capability of the high-accuracy localization, imaging and environment reconstruction obtained from the so-called "network as a sensor."

An ISAC waveform is a dual-functional waveform that allows the sensing and communication capabilities to share the signaling resources. For example, an ISAC waveform can be designed as loosely coupled with non-overlapped resource allocation, such as time-, frequency-, spatial- and code-division ISAC. In the time-division ISAC waveform, the transmission duration is split into radar sensing cycles and radio communication cycles, e.g., in units of frames, subframes, slots or symbols. Radar sensing can use a frequency-modulated continuous waveform (FMCW) with up- and down-chirp modulations. Radio communication can use a variety of modulation schemes, e.g., binary phase-shift keying (BPSK), pulse position modulation (PPM) and on-off keying (OOK). In the frequency-division ISAC waveform, e.g., constructed based on an orthogonal frequency-division multiplexing (OFDM) waveform, the sensing and communication capabilities are allocated to different subcarriers by determining the channel conditions, the required key performance indicators (KPIs) for sensing and communication, and the power budget of the transmitter. As another example, an ISAC waveform can be designed as tightly coupled and fully unified, by following sensing centric design (SCD), communication-centric design (CCD) or joint design (JD).

High sensing performance is required for B5G/6G sensing use cases. Specifically, next generation autonomous vehicle networks and V2X communication require range resolution on the order of a centimeter. Range resolution ($d_{res}$) is inversely proportional to the bandwidth (BW), i.e., $d_{res}$=c/2BW, where c is the velocity of light. For example, range resolution of 7.5 m, 1.5 m, 0.375 m and 0.1875 m correspond to a bandwidth of 20 MHz, 100 MHz, 400 MHz and 800 MHz, respectively, as listed in the following table. Subtler motions corresponding to vital signs such as the chest movement (4-12 mm) and heartbeat displacement (0.2-0.5 mm) shall be detected with an even larger bandwidth.

| BW | Range Resolution (dres = c/2BW) |
|---|---|
| 20 MHz | 7.5 m |
| 100 MHz | 1.5 m |
| 400 MHz | 0.375 m |
| 800 MHz | 0.1875 m |

Therefore, in a 5G OFDM system, in which the channel bandwidth BW is 100 MHz at the sub-6G frequency band and is 400 MHz at the mmWave band according to 3GPP Release 15, the worst-case range estimation errors for objects to be detected by a base station (BS) or user equipment (UE) are 0.75 m and 0.1875 m, respectively.

Given the above, a large bandwidth is very important for B5G/6G sensing use case. However, according to spectrum allocation, it is difficult to have a consecutive large bandwidth. In LTE and NR, carrier aggregation (CA) is employed to assign two or more component carriers (CCs) to a UE having a CA capability, thereby increasing the bandwidth and data rate of the UE. CCs can be organized into multiple cells, including one primary cell (PCell) and one or more secondary cells (SCells). The PCell is always activated, while the SCells can be activated or deactivated. After configured, an SCell is deactivated initially. When there is a huge amount of data to be delivered to the UE, a BS can activate the SCell to maximize downlink throughput. The BS can also deactivate the activated SCell when there is no more data to be delivered to the UE, to reduce the power consumption of the UE. The activation and the deactivation are done via media access control (MAC) control element (CE). Compared to LTE, NR has longer activation time due to SSB-based cell search, synchronization and beam management.

Two behaviors are introduced into the activation state, i.e., a dormancy behavior and an active behavior. An activated SCell can transition between these two behaviors. The UE can perform channel state information (CSI) measurements, automatic gain control (AGC) and beam management, and monitor physical downlink control channel (PDCCH) for an activated SCell with the active behavior. The UE does not monitor PDCCH for the activated SCell transitioned from the active behavior to the dormancy behavior, to reduce power consumption. The UE can still perform CSI measurements, AGC and beam management for the dormant SCell, and thus the SCell can be transitioned from the dormancy behavior to the active behavior quickly.

Although a large bandwidth is required for B5G/6G sensing use case to ensure high enough range resolution, but B5G/6G communication use case does not need high data rate (e.g., only one CC is enough). Therefore, some power consumption is unnecessary, if multiple CCs are always activated or activated in an active behavior, as only parts (e.g., one) of the activated CCs are used for data transmission and reception. According to the disclosure, a method is proposed to activate one or more SCells or further transition the active SCells from the dormancy behavior to the active behavior when a sensing task is performed and to deactivate the SCells or just transition the active SCells from the active behavior to the dormancy behavior when no sensing task is performed.

FIG. 1 shows a wireless communication system 100 according to some embodiments of the disclosure. The wireless communication system 100 can include at least one base station (BS) 120 and at least one user equipment (UE) 110. The BS 120 can be an eNB or a gNB. The UE 110 can be a vehicle, a computer, a mobile phone, and the like. The UE 110 can communicate with the BS 120. Aspects described herein can be used in the context of any spectrum management scheme, including, for example, dedicated licensed spectrum, unlicensed spectrum, and (licensed) shared spectrum (such as Licensed Shared Access (LSA) and Spectrum Access System (SAS)). In some embodiments, the UE 110 can be configured to communicate with the BS 120 using orthogonal frequency-division multiplexing (OFDM) communication signals over a multicarrier communication channel according to various communication techniques, such as an orthogonal frequency-division multiple access (OFDMA) communication technique (e.g., for downlink communications) or a single carrier frequency division multiple access (SC-FDMA) communication technique (e.g., for uplink and ProSe for sidelink communications). The OFDM signals can include a plurality of orthogonal subcarriers.

In some embodiments, the wireless communication system 100 can employ carrier aggregation (CA) to assign two or more carriers to the UE 110 having a CA capability according to service conditions, thereby increasing the bandwidth and data rate of the UE 110. The UE 110 can report to the BS 120 via UE Capability Information message of which combination of frequency bands it can support in terms of CA. Each aggregated carrier is referred to as a component carrier (CC). In CA, two or more CCs, which can have different bandwidths, can be aggregated, and the UE 110 can simultaneously receive or transmit on one or more CCs, depending on its capability. The number of CCs aggregated between downlink and uplink may be different. A scenario where the number of downlink CCs (DL CCs) is the same as the number of uplink CCs (UL CCs) is called a symmetric aggregation. Another scenario where the number of DL CCs and the number of UL CCs are different is called an asymmetric aggregation. CA can be implemented by aggregating contiguous CCs within the same frequency band, so called intra-band contiguous aggregation, by aggregating non-contiguous CCs within the same frequency band, so called intra-band non-contiguous aggregation, or by aggregating non-contiguous CCs within different frequency bands, so-called inter-band aggregation. Each CC (a scheduling CC) can be individually scheduled with a scheduling assignment/grant on either the same (associated) CC (i.e., a scheduled CC) as the data (which is referred to as self-scheduling) or on a different CC than the data (which is referred to as cross-carrier scheduling). That is, a scheduling CC can be the same as or different from a scheduled CC.

When CA is used, there are a number of serving cells, one for each CC. CCs can be organized into multiple serving cells, including one primary serving cell (PCell) and one or more secondary serving cells (SCells), which can provide different coverages (i.e., different cell sizes) due to that the CCs on different frequency bands will experience different pathloss, for example. The cell that the UE 110 selects during initial establishment (e.g., RRC Connection Request/RRC Connection Re-establishment Request) will become the PCell. After RRC connection is established, the BS 120 can add/configure the SCell(s) using RRC Connection Reconfiguration message to provide additional radio resources. The PCell and the SCells can be configured through a radio resource control (RRC) parameter. In the example shown in FIG. 1, the wireless communication system 100 can include a PCell 130-1 and two SCells 130-2 and 130-3. The RRC is only handled by one cell, that is, the PCell 130-1, served by a primary CC (PCC). For example, the UE 110 can receive on downlink PCC non-access stratum (NAS) information such as security parameters. The other CCs are all referred to as secondary CCs (SCCs), serving the SCells 130-2 and 130-3.

The PCC (and the PCell 130-1) can be changed only at handover, while the SCCs (and the SCells 130-2 and 130-3) can be added/configured, released/removed and reconfigured/modified as required. For example, the SCell 130-2 may be added either blindly or after the BS 120 receives a measurement report with a certain event from the UE 110 indicating that the reference signal received power (RSRP) of the SCell 130-2 is above a threshold. For example, at the time of SCell addition, the BS 120 can send SCellIndex, cellIdentification, radioResourceConfigCommonSCell, radioResourceConfigDedicatedSCell, etc. to the UE 110 via RRC Connection Reconfiguration message. The SCell 130-2, when configured through an RRC Connection Reconfiguration procedure, remains in a deactivated state and waits to be activated. When the SCell 130-2 is modified, the UE 110 does not change the activation status. The BS 120 can use IE SCellToReleaseList in RRC Connection Reconfiguration message to release the SCell 130-2. During handover, if the SCell 130-2 is still in use in the target PCell (that is, the SCell 130-2 is not released during handover), the SCell 130-2 in the target PCell is initially in the deactivated state.

Figure 2:
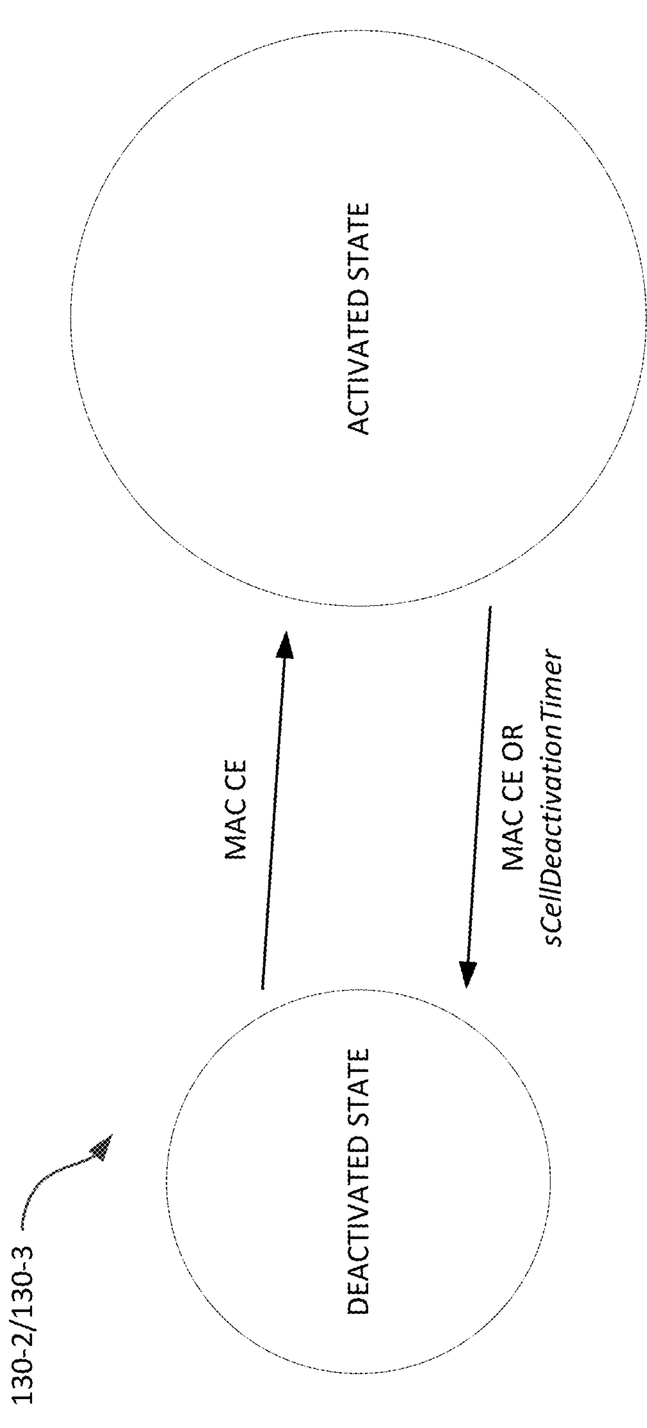
FIG. 2 shows transitioning of an SCell between an activated state and an deactivated state according to some embodiments of the disclosure.

FIG. 2 shows transitioning of an SCell, e.g., the SCell 130-2 or the SCell 130-3, between an activated state and an deactivated according to some embodiments of the disclosure. The PCell 130-1 is always activated. In order for the UE 110 to receive data on at least one of the SCells 130-2 and 130-3, the SCell 130-2 for example, the SCell 130-2 has to be activated. For example, when there is a huge amount of data to be delivered to the UE 110, the BS 120 can activate the SCell 130-2 to maximize downlink throughput. The activation is done via media access control (MAC) control element (CE). After receiving the MAC CE activating the SCell 130-2, the UE 110 can maintain a timer (SCellDeactivationTimer) for the SCell 130-2 and deactivate the SCell 130-2 upon its expiry. Upon the SCell 130-2 activation, the UE 110 can transmit a sounding reference signal (SRS) on the SCell 130-2, report channel state information (CSI) for the SCell 130-2 (e.g., channel quality indicator (CQI), precoding matrix indicator (PMI), rank indicator (RI) and precoding type indicator (PTI)), monitor PDCCH on the SCell 130-2, and monitor PDCCH for the SCell 130-2 (e.g., cross-carrier scheduling).

The BS 120 can also deactivate the activated SCell 130-2 when there is no more data to be delivered to the UE 110 or the channel quality of the SCell 130-2 turns deteriorated, to reduce the power consumption of the UE 110. The UE 110 can deactivate the SCell 130-2 based on SCellDeactivationTimer. The value of SCellDeactivationTimer can be preconfigured. For example, SCellDeactivationTimer can take values starting from 20 ms to 1280 ms. If the UE 110 has not received any data on the SCell 130-2 when SCellDeactivationTimer expires, the UE 110 deactivates the SCell 130-2. The BS 120 can also send to the UE 110 a deactivation MAC CE indicating at least one of the configured SCells 130-2 and 130-3 to be deactivated. For example, the deactivation MAC CE can be identified by a MAC protocol data unit (PDU) subheader with a unique logical channel ID (LCID): 11011, have a fixed size, and consist of a single octet containing one R-field (i.e., a reserved bit set to "0") and seven C-fields each representing an SCell with SCellindex i ranging from 1-7. For example, the C-field can be set to "1" to indicate that the SCell with SCellIndex i shall be activated, or can be set to "0" to indicate that the SCell with SCellIndex i shall be deactivated. After receiving the MAC CE deactivating the SCell 130-2, the UE 110 can deactivate the SCell 130-2, and, upon the SCell 130-2 deactivation, stop transmitting the SRS on the SCell 130-2, reporting the CSI for the SCell 130-2 and monitoring PDCCH for the SCell 130-2.

The BS 120 can send the activation MAC CE to the UE 110 again to reactivate the re-deactivated SCell 130-2, and the UE 110 can then transmit the SRS on the SCell 130-2, report the CSI for the SCell 130-2 and monitor PDCCH for the SCell 130-2.

The SCell activation time (or the SCell activation latency) is defined as the time required for an SCell activation procedure after the UE 110 receives the activation MAC CE. The SCell activation procedure can include radio frequency (RF) power on, frequency tuning, automatic gain control (AGC), RF and frequency correction, SCell timing synchronization, and master information block (MIB) reading (for unknown SCell). For example, the main latency contributors may be AGC (which needs at least 1 or 2 synchronization signal blocks (SSBs)), frequency tracking loop (FTL)/time tracking loop (TTL), and MIB reading. Under a typical SS/PBCH block measurement time configuration (SMTC) (e.g., 20 ms), NR SCell activation latency is even longer than LTE, as the SSBs are much sparser in NR than cell specific reference signals (CRSs) in LTE. In NR, the SCell activation procedure can further include beam management (for frequency range 2 (FR2)), and thus the SCell activation latency is further increased.

Figure 3:
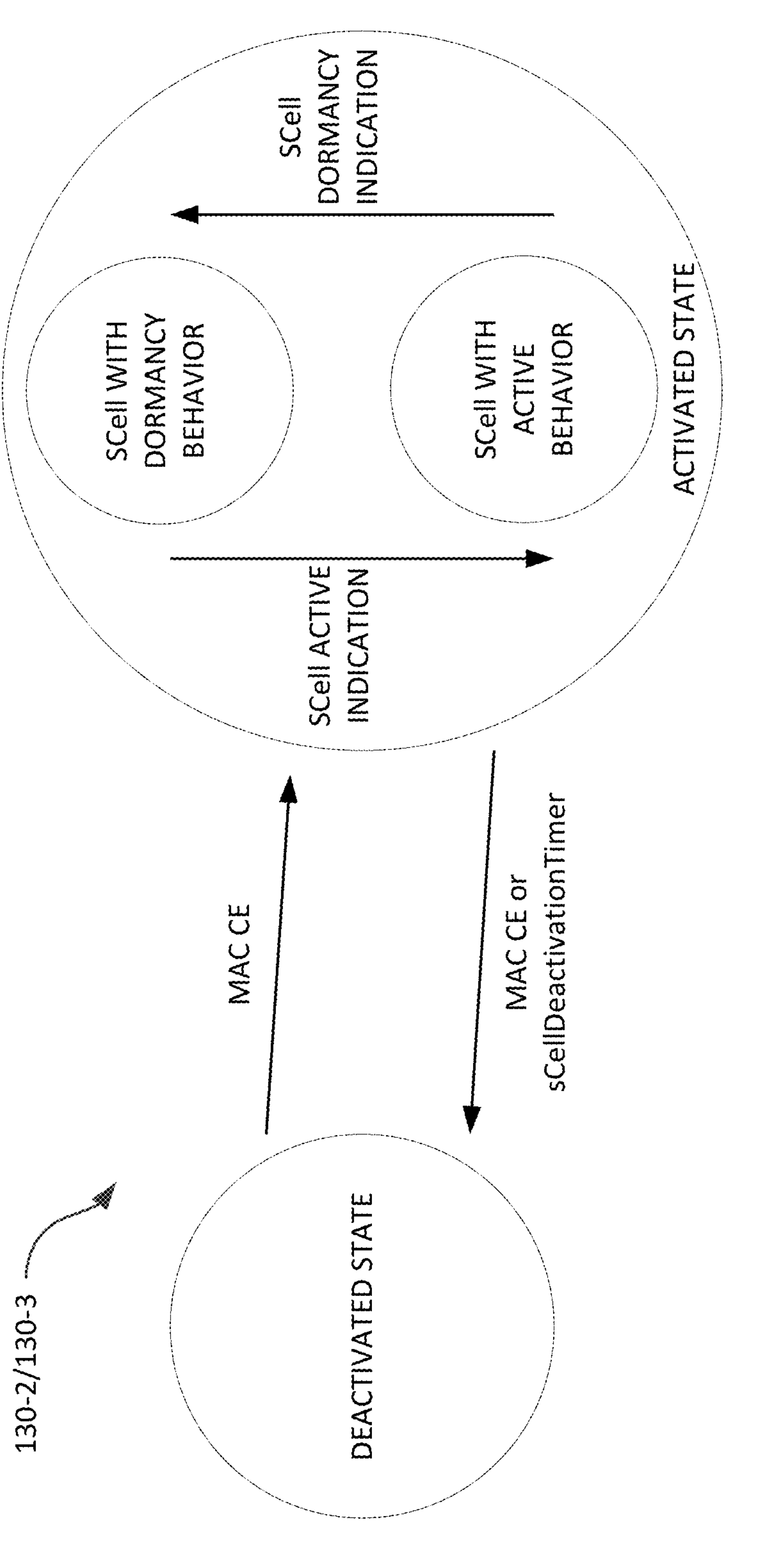
FIG. 3 shows transitioning of an activated SCell between an active behavior and a dormancy behavior according to some embodiments of the disclosure.

FIG. 3 shows transitioning of an activated SCell, e.g., the SCell 130-2 or the SCell 130-3, between an active behavior and a dormancy behavior according to some embodiments of the disclosure. For example, the activated SCell 130-2 can be transitioned from the dormancy behavior to the active behavior when the PCell 130-1 has data scheduling activity or is switched to a large data bandwidth part (BWP). When the SCell 130-2 is activated with the active behavior, the UE 110 can transmit the SRS on the SCell 130-2, report CSI for the SCell 130-2, and monitor PDCCH for the SCell 130-2. When the SCell 130-2 is transitioned from the active behavior to the dormancy behavior, the UE 110 can still transmit the SRS on the SCell 130-2 and report CSI for the SCell 130-2, but stop monitoring PDCCH for the SCell 130-2, to reduce power consumption. The SCell activation latency required for the SCell activation procedure can depend on the readiness of the SCell. For example, if the SCell to be configured has been measured by the UE 110 or the UE 110 has valid prior knowledge on synchronization and AGC of the SCell, the SCell activation latency can be reduced. Therefore, the latency required to transition an activated SCell from the dormancy behavior to the active behavior is far shorter than the SCell activation latency required to transition an SCell from a deactivated state to an activated state, as the UE 110 already knows the synchronization and AGC of the activated SCell.

In NR, up to 16 DL CCs can be configured for the UE 110. Considering DCI size alignment, at least 15 bits (e.g., a bitmap of a length=15 bits) are required to configure as many as 15 SCells associated with the 15 CCs. For example, in downlink control information (DCI) without data scheduling the following fields of a transport block 1 (TB1) can be repurposed for dormancy indication: modulation coding scheme (MCS) (5 bits), new data indicator (NDI) (1 bits), redundancy version (RV) (2 bits), hybrid automatic repeat request (HARQ) process number (4 bits), antenna ports (>4 bits) and demodulation reference signal (DMRS) sequence initialization (1 bits).

A bandwidth part (BWP) is a contiguous set of physical resource blocks (PRBs), selected from a contiguous subset of the common resource blocks for a given numerology in bandwidth part on a given carrier. The UE 110 can be configured with up to four DL BWPs per carrier in the downlink with a single DL BWP being active at a given time. Also, the UE 110 can be configured with up to four UL BWPs in the uplink per carrier with a single UL BWP being active at a given time. If the UE 110 is configured with a supplementary uplink, the UE 110 can in addition be configured with up to four supplementary UL BWPs per carrier in the supplementary uplink with a single supplementary UL BWP being active at a given time. The four DL/UL BWPs consist of initial, active and UE-specific DL/UL BWPs. The UE 110 is not expected to receive PDSCH, PDCCH or CSI-RS (except for radio resource management (RRM)) outside the active DL BWP. Similarly, the UE 110 shall not transmit PUSCH or PUCCH outside the active UL BWP.

Figure 4:
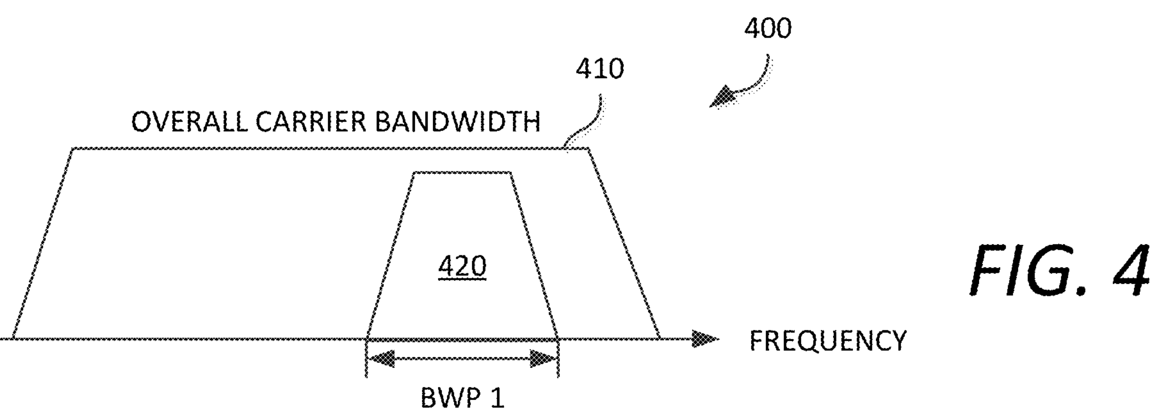
FIGS. 4-6 show three different BWP allocation scenarios according to some embodiments of the disclosure.
Figure 5:
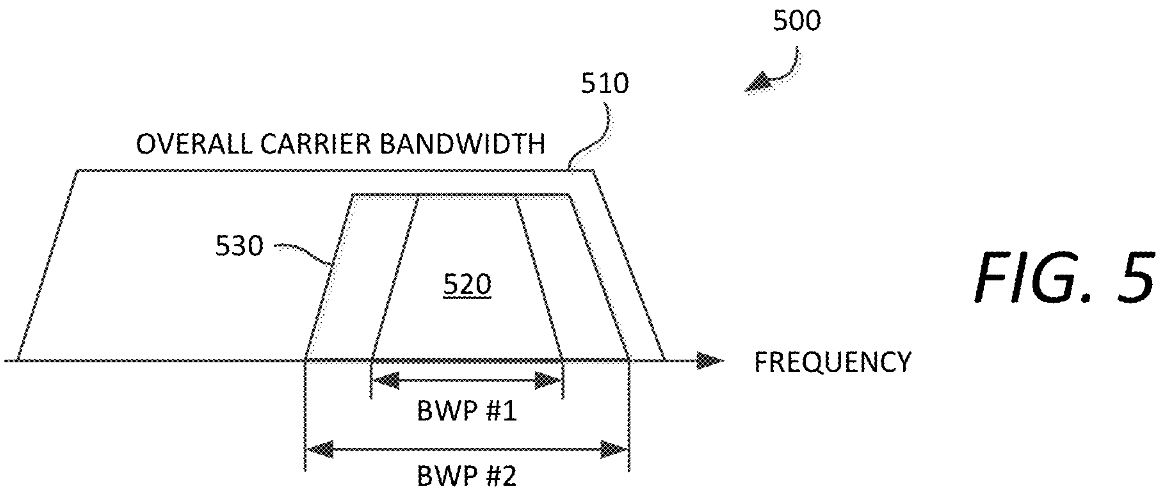
Figure 6:
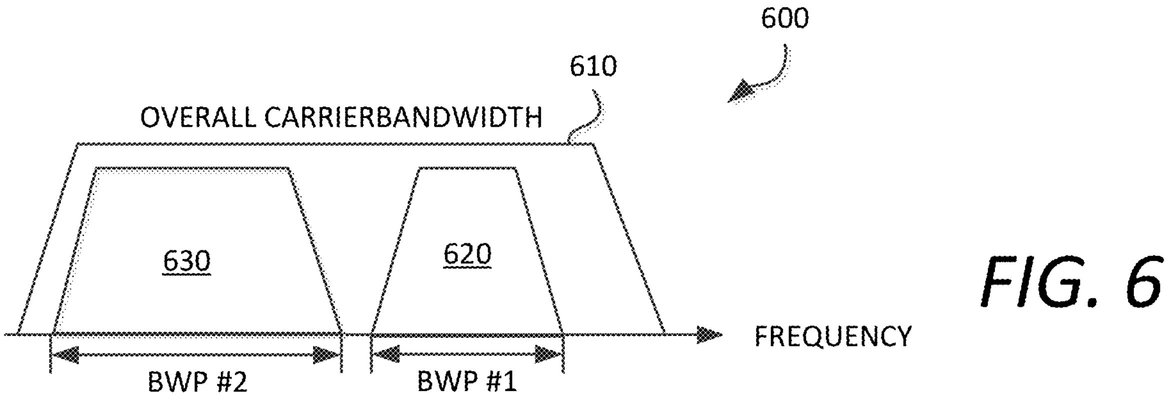

FIGS. 4-6 show three different BWP allocation scenarios 400, 500, and 600 according to some embodiments of the disclosure. As shown in FIG. 4, the BWP allocation scenario 400 can support reduced UE bandwidth capability (e.g., BWP #1 420) that is especially helpful for UEs with limited RF capability or not capable of full carrier bandwidth (e.g., an overall carrier bandwidth 410). As shown in FIG. 5, the BWP allocation scenario 500 can support reduced UE power consumption for intermittent and bursty traffic profile. For example, the UE 110 can operate on BWP #1 520 in an overall carrier bandwidth 510 for intermittent traffic profile, and be switched to operate on BWP #2 530 for receiving bursty data. In the BWP allocation scenario 500, BWP #1 520 and BWP #2 530 have the same central frequency and subcarrier spacing (SCS) but different bandwidths. As shown in FIG. 6, the BWP allocation scenario 600 can support two non-contiguous BWPs with different numerologies allowing different services multiplexing. In the BWP allocation scenario 600, BWP #1 620 and BWP #2 630 in an overall carrier bandwidth 610 have different central frequencies, bandwidths and SCSs.

Each BWP is defined by the following configuration parameters: numerology, including cyclic prefix (CP) length, SCS and symbol duration; frequency location, including an offset between the BWP and a reference point; bandwidth size in terms of physical resource blocks (PRBs); and control resource set (CORESET).

According to the 3rd generation partnership project (3GPP) TS 38.321, BWP selection and switching can be done with the following mechanisms. RRC-based adaptation (e.g., using a dedicated RRC signaling) is suitable for semi-static cases since the processing of RRC messages requires extra time, letting the latency reach as long as 10 msec. MAC control element (CE) adaptation is used upon initiation of a random access procedure. DCI-based adaptation (e.g., using a PDCCH downlink control information (DCI)) is based on PDCCH channel where a specific BWP can be activated by BWP indicator in DCI format 0_1 (UL grant) and DCI format 1_1 (DL scheduling). DCI-based adaptation, though having latency as low as 2 msec, requires additional considerations for error case handling, as the UE 110 may fail to decode the DCI having the BWP activation/deactivation command. To help to recover from such a DCI lost scenario, timer-based implicit fallback to default BWP (e.g., a bwp-inactivity timer) is designed to mitigate possible DCI errors. After the UE 110 receives the DCI-based BWP switching command, the timer starts to run. If the UE 110 is not explicitly scheduled with a BWP after the timer expires, it will automatically switch its active DL BWP to a default BWP.

There is an initial BWP for the UE 110 during the initial access until the UE 110 is explicitly configured with BWPs during or after RRC connection establishment. For a serving cell of the BS 120, the UE 110 can be provided by default-Downlink BWP_Id a default DL BWP between the configured DL BWPs. If the UE 110 is not provided a default DL BWP by defaultDownlink BWP_Id, the default DL BWP is the initial DL BWP.

Figure 7:
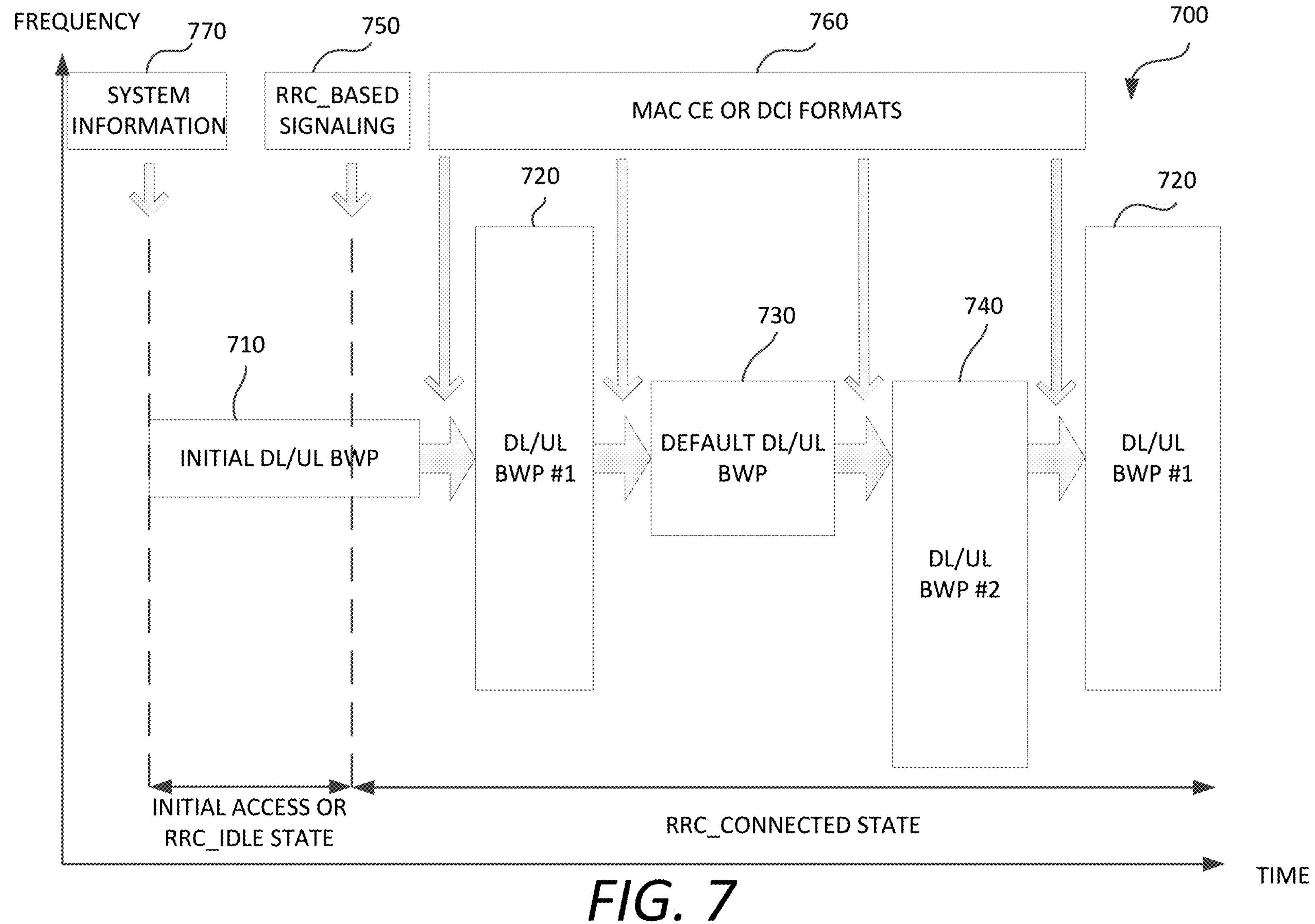
FIG. 7 shows DL/UL BWP switching according to some embodiments of the disclosure.

FIG. 7 shows a DL/UL BWP switching 700 according to some embodiments of the disclosure. As shown, initial DL/UL BWP 710, DL/UL BWP #1 720 and default DL/UL BWP 730 have the same central frequency but different bandwidths, but are different from DL/UL BWP #2 740 in terms of central frequencies and bandwidths. The UE 110 in a radio resource control idle (RRC_idle) state can perform a random access procedure based on system information 770, and enter an RRC_connected state. Then the UE 110 can be configured initial DL/UL BWP 710, DL/UL BWP #1 720, default DL/UL BWP 730 and DL/UL BWP #2 740 by RRC-based signaling 750 from higher layers that may include a variety of parameters, such as PRB-index-DL-common, initialDownlinkBWP, BWP-DownlinkDedicated, firstActiveDownlinkBWP-Id, locationAndBandwidth and bwp-InactivityTimer, and use initial DL/UL BWP 710 as an active DL/UL BWP to receive and transmit data. In some embodiments, a BWP switching process can be performed by MAC CE or DCI formats 760 to switch initial DL/UL BWP 710 to one of DL/UL BWP #1 720, default DL/UL BWP 730 and DL/UL BWP #2 740 as an active DL/UL BWP. For example, a bandwidth part indicator field in DCI format 1_1, if configured, can indicate the active DL BWP. For another example, a bandwidth part indicator field in DCI format 0_1, if configured, can indicate the active UL BWP. If a bandwidth part indicator field is configured in DCI format 0_1 or DCI format 1_1 and indicates an UL BWP or a DL BWP different from the active UL BWP or DL BWP, respectively, the UE 110 shall set the active UL BWP or DL BWP to the UL BWP or DL BWP indicated by the bandwidth part indicator in the DCI format 0_1 or DCI format 1_1, respectively.

According to the disclosure, methods are proposed to activate one or more SCells or further transition the active SCells from the dormancy behavior to the active behavior when a sensing task is performed and to deactivate the SCells or just transition the active SCells from the active behavior to the dormancy behavior when no sensing task is performed.

Figure 8:
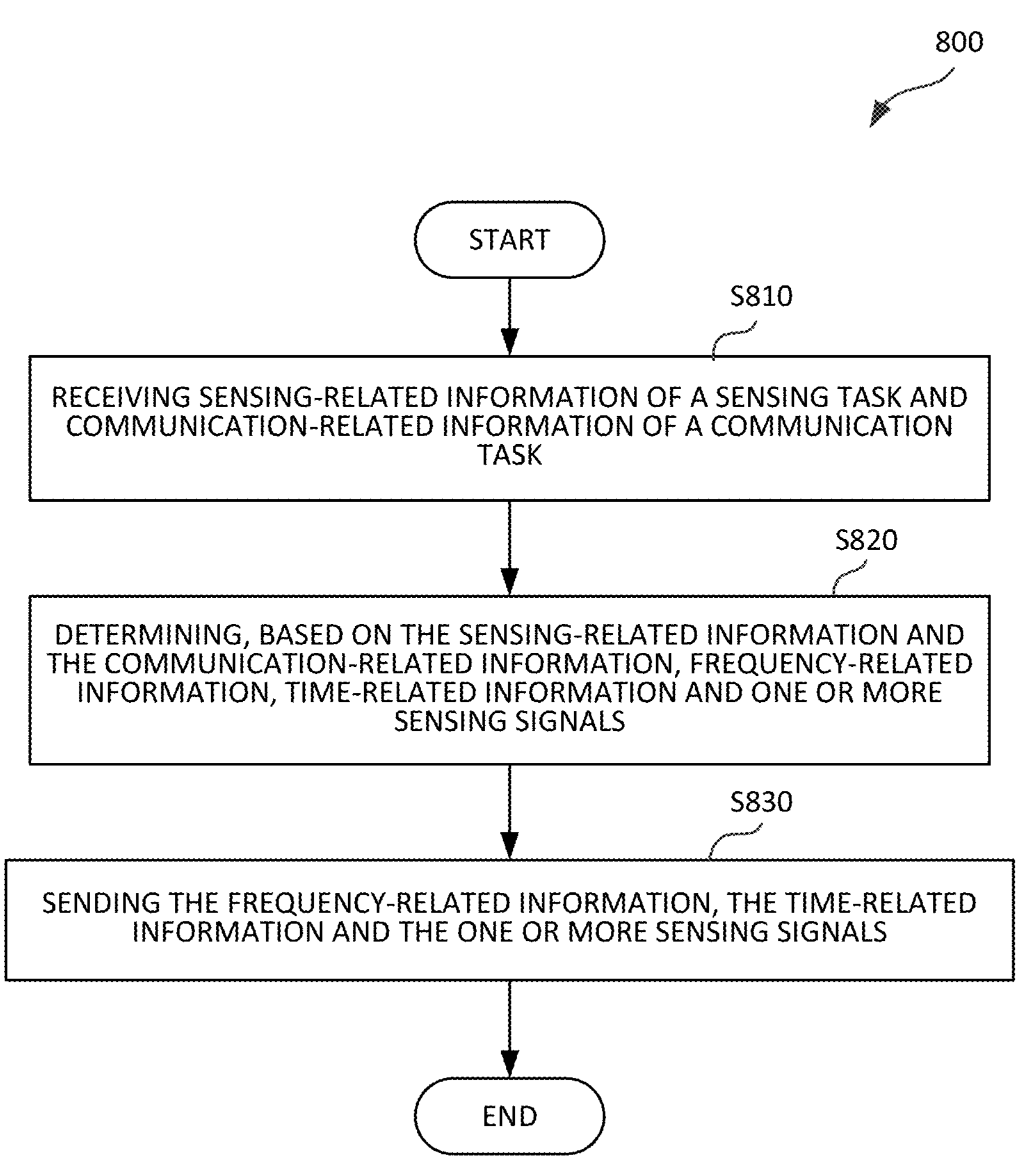
FIG. 8 shows a flow chart of a method for transitioning one or a plurality of activated SCells between an active behavior and a dormancy behavior according to some embodiments of the disclosure.

FIG. 8 shows a flow chart of a method 800 for integrating sensing and communication according to some embodiments of the disclosure. In various embodiments, some of the steps of the method 800 shown can be performed concurrently or in a different order than shown, can be substituted by other method steps, or can be omitted. Additional method steps can also be performed as desired. Aspects of the method 800 can be implemented by a wireless device, such as the BS 120 illustrated in and described with respect to the preceding figures.

At step S810, sensing-related information of a sensing task and communication-related information of a communication task are received. For example, the sensing-related information and the communication-related information can be transmitted by a UE, e.g., the UE 110, and received by a BS, e.g., the BS 120. In an embodiment, the sensing-related information can include the type of the sensing task, e.g., heartbeat displacement, range resolution of the sensing task, e.g., 0.2-0.5 mm, and a sensing schedule of the sensing task, e.g., 1 min/hr. In another embodiment, the sensing-related information can further include UL/DL signals needed for the sensing tasks, e.g., a demodulation reference signal (DMRS), a synchronization signal block (SSB) signal, a channel state information reference signal (CSI-RS), a sounding reference signal (SRS) and a random access channel (RACH) signal. In some embodiments, the communication-related information can include a data rate of signals that the UE can transmit in the communication task.

At step S820, frequency-related information, time-related information and one or more sensing signals are determined based on the sensing-related information and the communication-related information. For example, the BS 120 can determine the frequency-related information, the time-related information and the one or more sensing signals based on the sensing-related information and the communication-related information, which are sent by the UE 110. In some embodiments, the BS 120 may further determine CCs that a network where the BS 120 is located can select and its preference for the CCs. The frequency-related information, the time-related information and the one or more sensing signals can be used by the UE 110 to perform the sensing task and the communication task by applying carrier aggregation (CA) and secondary cell (SCell) dormancy behavior. In an embodiment, the frequency-related information can include a bandwidth, a number of component carriers (CCs) and the PCC, and identities of the CCs (CC IDs) on which the UE 110 can perform the sensing task and the communication task, and the time-related information can include an activation/deactivation schedule of one or more SCells including the CCs and an active/dormancy behavior transition schedule of the SCells. In another embodiment, the one or more sensing signals determined by the BS 120 can include at least one of a demodulation reference signal (DMRS), a synchronization signal block (SSB) signal, a channel state information reference signal (CSI-RS), a sounding reference signal (SRS), a random access channel (RACH) signal, and a chirp signal.

At step S830, the BS 120 sends the frequency-related information, time-related information and one or more sensing signals, for the UE 110 to perform the sensing task and the communication task by applying CA and SCell dormancy behavior.

Figure 9:
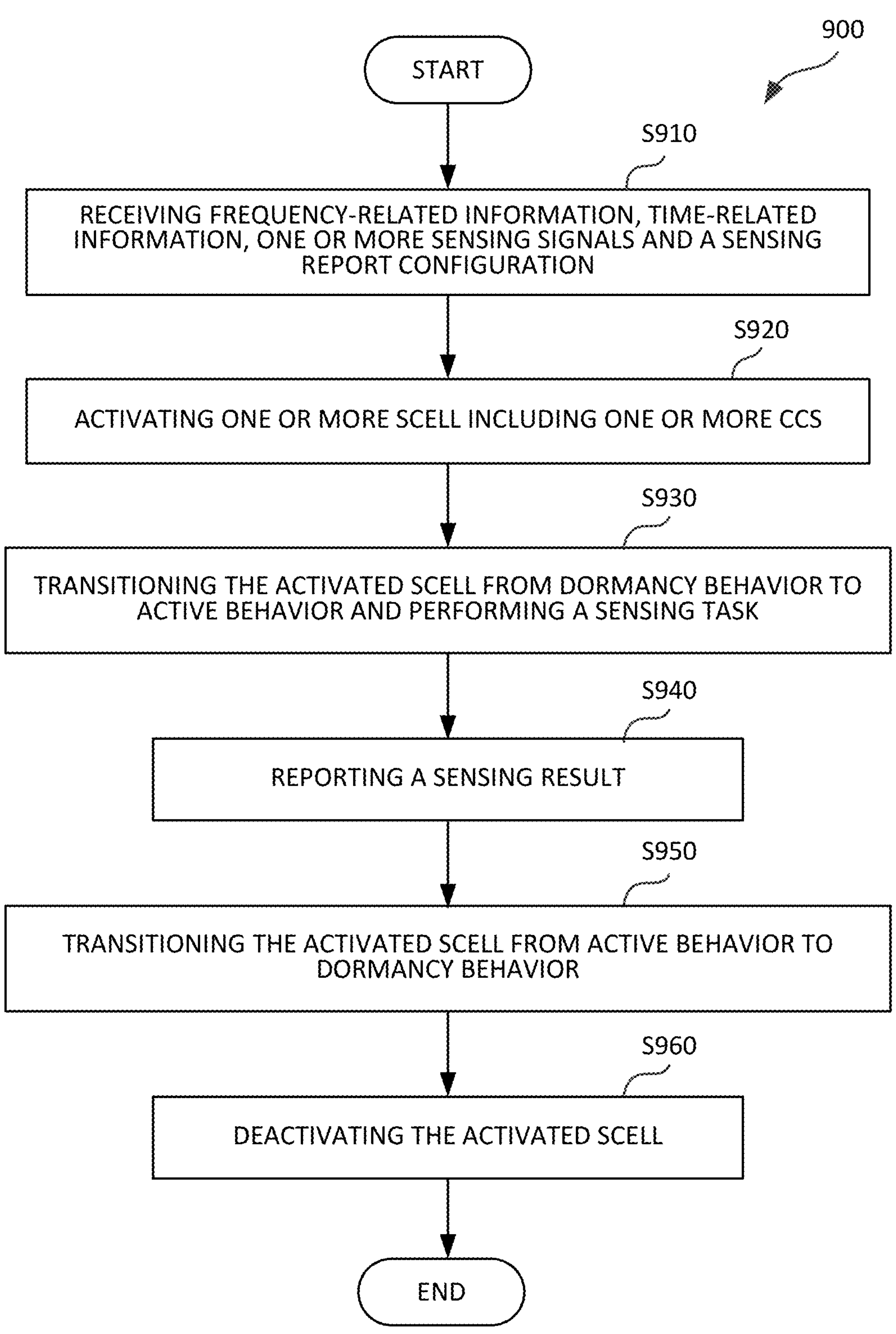
FIG. 9 shows a flow chart of a method for integrating sensing and communication by applying carrier aggregation (CA) and secondary cell (SCell) dormancy behavior according to some embodiments of the disclosure.

FIG. 9 shows a flow chart of a method 900 for integrating sensing and communication by applying CA and SCell dormancy behavior according to some embodiments of the disclosure. In various embodiments, some of the steps of the method 900 shown can be performed concurrently or in a different order than shown, can be substituted by other method steps, or can be omitted. Additional method steps can also be performed as desired. Aspects of the method 900 can be implemented by a wireless device, such as the UE 110 illustrated in and described with respect to the preceding figures.

At step S910, frequency-related information, time-related information and one or more sensing signals are received. For example, the UE 110 can receive the frequency-related information, the time-related information and the one or more sensing signals, and the frequency-related information, the time-related information and the one or more sensing signals can be determined by the BS 120 based sensing-related information of a sensing task and communication-related information of a communication task that the UE 110 sends to the BS 120. The UE 110 can thus perform the sensing task and the communication task by applying CA and SCell dormancy behavior based on the frequency-related information, the time-related information and the one or more sensing signals. In an embodiment, the frequency-related information can include a bandwidth, a number of CCs, and CC IDs on which the UE 110 can perform the sensing task and the communication task, and the time-related information can include an activation/deactivation schedule of one or more SCells including the CCs and an active/dormancy behavior transition schedule of the SCells. In another embodiment, the one or more sensing signals determined by the BS 120 can include at least one of a DMRS, an SSB signal, a CSI-RS, an SRS, a RACH signal and a chirp signal.

In an embodiment, at step S910, a sensing report configuration can be further received. For example, the BS 120 can configure the UE 110, through the sensing report configuration, to report a sensing result of the sensing task, e.g., a heartbeat rate.

Figure 10:
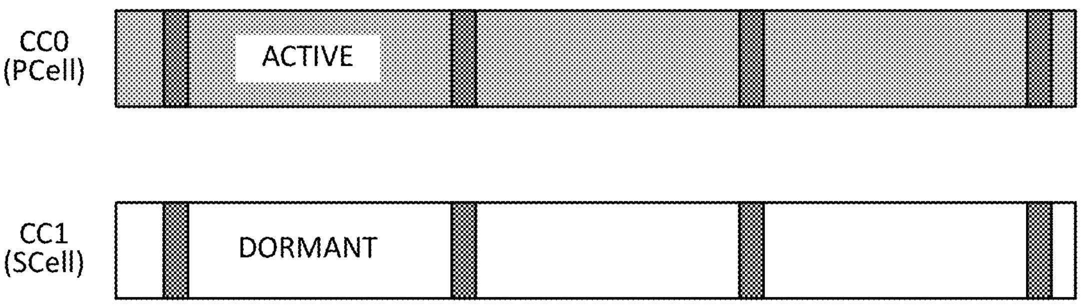
FIG. 10 shows two activated component carriers that are in active behavior and in dormancy behavior, respectively.
Figure 11:
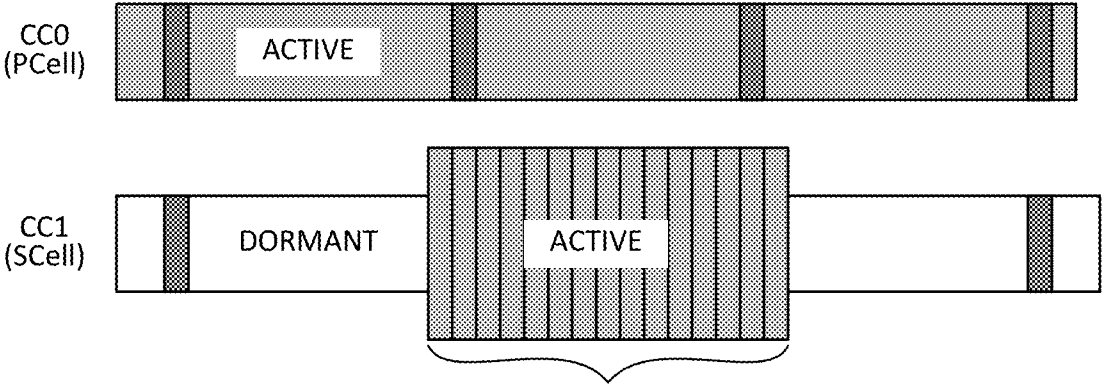
FIG. 11 shows two activated component carriers that are in active behavior.

At step S920, one or more SCells each including one or more component carriers (CCs) can be activated based on the frequency-related information via MAC CE, for example. Then, the communication task can be performed. For example, the BS 120 can determine, based on the sensing-related information and the communication-related information, a bandwidth of 200 MHz and two CCs, e.g., CC0 (a PCC for a PCell) and CC1 (an SCC for a SCell), each of which has a bandwidth of 100 MHz. In an embodiment, CC0 is used for the communication task and the PCell including CC0 is activated and always active, and CC1, together with CC0, is used for the sensing task and the SCell including CC1 is activated but dormant when the communication task is performed, as shown in FIG. 10, or is activated and active when the sensing task, which requires a larger bandwidth, is performed, as shown in FIG. 11.

At step S930, the activated SCell (including CC1) is transitioned from a dormancy behavior to an active behavior via DCI, for example, based on the time-related information, e.g., the active/dormancy behavior transition schedule of the SCell. Then, the sensing task can be performed by using the one or more sensing signals, such as a DMRS, an SSB signal, a CSI-RS, an SRS, a RACH signal and a chirp signal. In an embodiment, given an agreement with the BS 120 and the UE 110, the BS 120 can send symbol signals and/or the sensing signals at each of the symbols in a period during which the sensing task is performed, and the UE 110 can combine these symbol signals and/or the sensing signals to achieve a better sensing result.

At step S940, a sensing result of the sensing task is reported. For example, the UE 110 can send the sensing result of the sensing task to the BS 120.

At step S950, the active SCell is transitioned from the active behavior to the dormancy behavior after the sensing task is complete, to save power of the UE 110.

At step S960, the active SCell is deactivated, to further save power of the UE 110.

Figures 12, 13, 14:
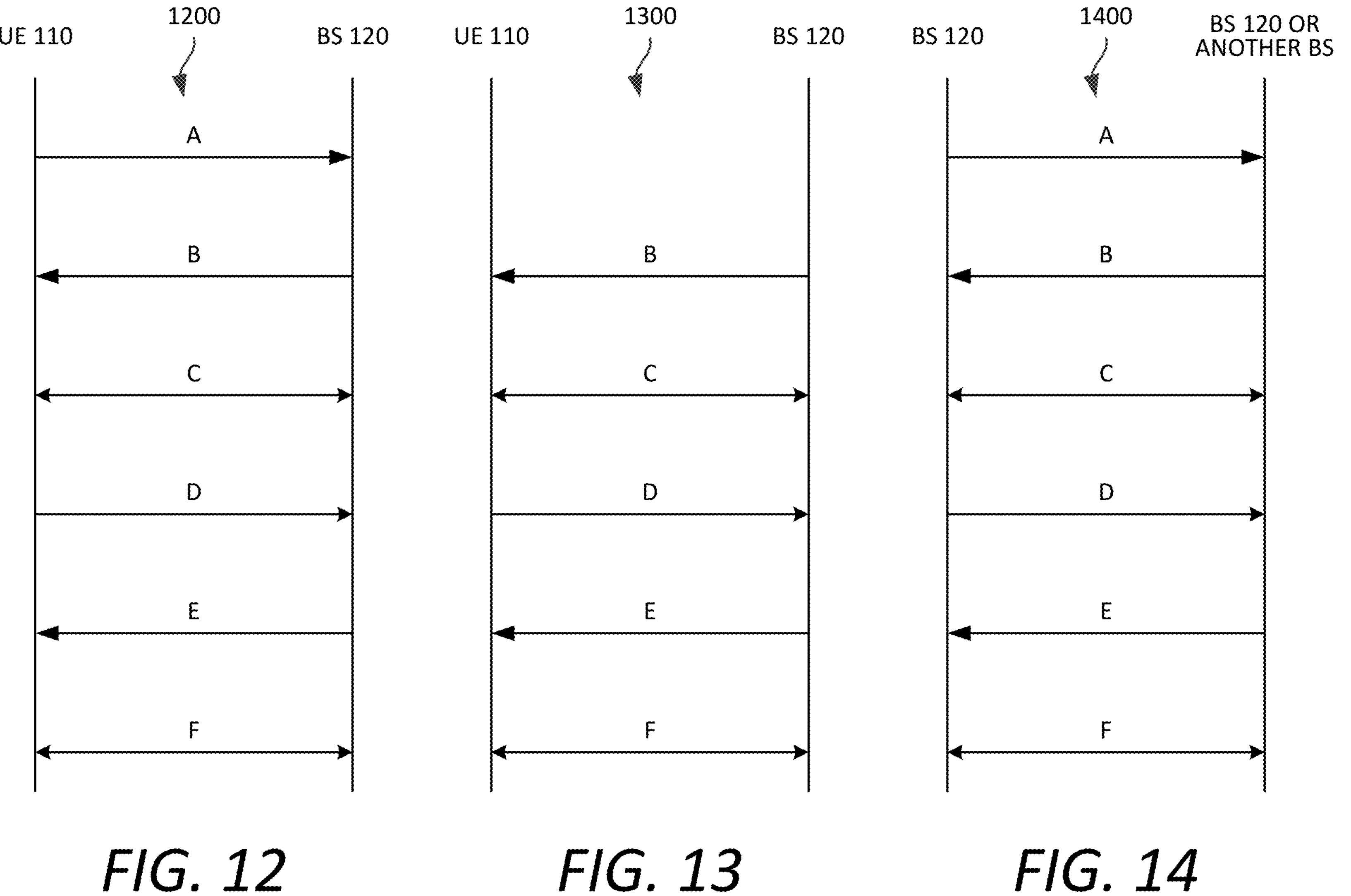
FIGS. 12-14 show three use cases of the methods according to some embodiments of the present disclosure.

FIGS. 12-14 show three use cases 1200, 1300 and 1400 of the methods according to some embodiments of the present disclosure. In the use case 1200, the UE 110 is required to perform a sensing task, and needs a larger bandwidth as compared with a bandwidth that is used for a communication task. At stage A, the UE 110 can send the sensing-related information of the sensing task and the communication-related information of the communication task to the BS 120. In an embodiment, the sensing-related information can include the type of the sensing task, e.g., heartbeat displacement, breaching detection, gesture recognition, and positioning, range resolution of the sensing task, e.g., 0.2-0.5 mm and 0.1875 m, a sensing schedule of the sensing task, e.g., 1 min/hr, UL/DL signals needed for the sensing tasks, e.g., a demodulation reference signal (DMRS), a synchronization signal block (SSB) signal, a channel state information reference signal (CSI-RS), a sounding reference signal (SRS) and a random access channel (RACH) signal. In some embodiments, the communication-related information can include a data rate of signals that the UE 110 can transmit in the communication task.

At stage B, the BS 120 can determine, based on the sensing-related information and the communication-related information, frequency-related information, time-related information and one or more sensing signals. For example, the BS 120 can determine the frequency-related information, the time-related information and the one or more sensing signals based on the sensing-related information and the communication-related information, which are sent by the UE 110. The BS 120 may further determine CCs that a network where the BS 120 is located can select and its preference for the CCs. In an embodiment, the frequency-related information can include a bandwidth, a number of component carriers (CCs), and identities of the CCs (CC IDs) on which the UE 110 can perform the sensing task and the communication task, and the time-related information can include an activation/deactivation schedule of one or more SCells including the CCs and an active/dormancy behavior transition schedule of the SCells. In another embodiment, the one or more sensing signals determined by the BS 120 can include at least one of a demodulation reference signal (DMRS), a synchronization signal block (SSB) signal, a channel state information reference signal (CSI-RS), a sounding reference signal (SRS), a random access channel (RACH) signal, and a chirp signal. At stage B, the BS 120 can send the frequency-related information, the time-related information and the one or more sensing signals to the UE 110. In an embodiment, the BS 120 can further send a sensing report configuration to the UE 110 to configure the UE 110 to report a sensing result of the sensing task after the sensing task is completed.

At stage C, one or more SCells including one or more CCs can be activated based on the frequency-related information via MAC CE, for example. Then, the communication task can be performed. For example, the BS 120 can determine, based on the sensing-related information and the communication-related information, CC0 (a PCC for a PCell) and CC1 (an SCC for a SCell).

At stage D, the activated SCell (including CC1) is transitioned from a dormancy behavior to an active behavior via DCI, for example, based on the time-related information, e.g., the active/dormancy behavior transition schedule of the SCell. Then, the sensing task can be performed by using the one or more sensing signals, such as a DMRS, an SSB signal, a CSI-RS, an SRS, a RACH signal and a chirp signal. In an embodiment, the UE 110 can report the sensing result of the sensing task to the BS 120 based on the sensing report configuration.

At stage E, the active SCell can be transitioned by the BS 120 via DCIs from the active behavior to the dormancy behavior after the sensing task is complete, to save power of the UE 110.

At stage F, the active SCell can be released and deactivated by the BS 120 via MAC CE, to further save power of the UE 110.

The use case 1300 differs from the use case 1200 in that in the use case 1300 it is the BS 120 that is required to perform a sensing task, and stage A can be omitted. In the use case 1300, at stage D the UE 110 has to report the sensing result to the BS 120.

The use case 1400 differs from the use case 1200 in that in the use case 1400 it is the BS 120 that is required to perform a sensing task and a sensing result is reported to itself and to another BS.

Figure 15:
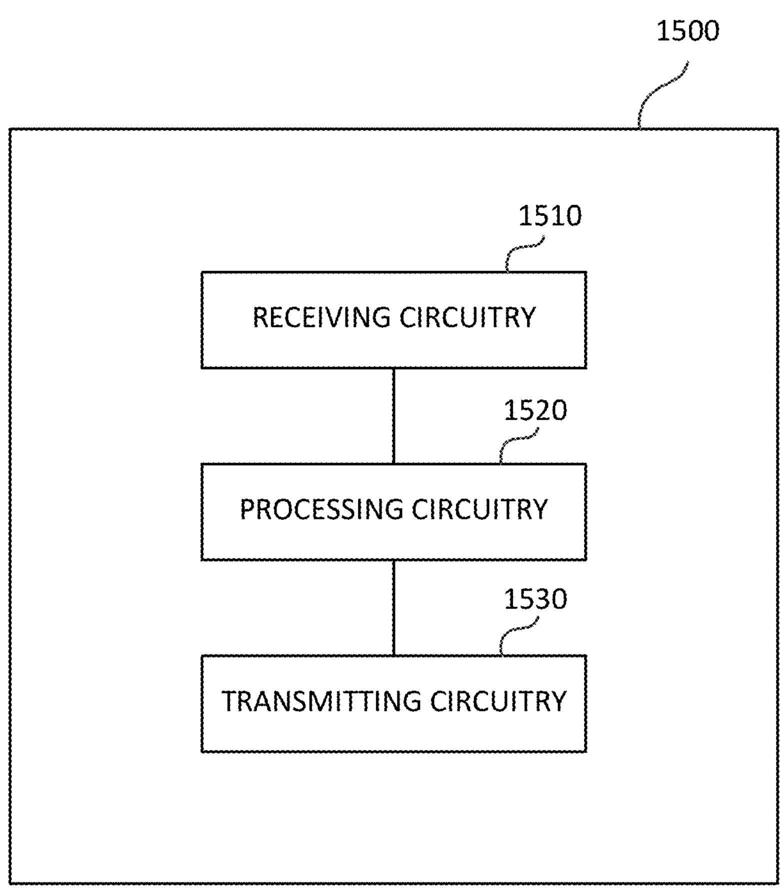
FIG. 15 shows a functional block diagram of an apparatus for integrating sensing and communication according to some embodiments of the disclosure.

FIG. 15 shows a functional block diagram of an apparatus 1500 according to some embodiments of the disclosure. The apparatus 1500 can be configured to perform various functions in accordance with one or more embodiments or examples described herein. Thus, the apparatus 1500 can provide means for implementation of mechanisms, techniques, processes, functions, components or systems described herein. For example, the apparatus 1500 can be used to implement functions of UEs or BSs in various embodiments and examples described herein. The apparatus 1500 can include a general purpose processor or specifically designed circuits to implement various functions, components or processes described herein in various embodiments. In some embodiments, the apparatus 1500 can include receiving circuitry 1510, processing circuitry 1520 and transmitting circuitry 1530.

In an embodiment, the receiving circuitry 1510 can be configured to receive the sensing-related information and the communication-related information. In another embodiment, the receiving circuitry 1510 can be configured to receive the frequency-related information, the time-related information and the one or more sensing signals.

In an embodiment, the processing circuitry 1520 can be configured to determine the frequency-related information, the time-related information and the one or more sensing signals based on the sensing-related information and the communication-related information. In another embodiment, the processing circuitry 1520 can activate/deactivate one or more SCell including CCs and transition the active SCells between active behavior and dormancy behavior.

In an embodiment, the transmitting circuitry 1530 can be configured to send the sensing-related information, the communication-related information and the sensing result. In another embodiment, the transmitting circuitry 1530 can be configured to send the frequency-related information, the time-related information, the one or more sensing signals and the sensing report configuration.

In various embodiments according to the disclosure, the receiving circuitry 1510, the processing circuitry 1520 and the transmitting circuitry 1530 can include circuitry configured to perform the functions and processes described herein in combination with software or without software. In various examples, the processing circuitry 1520 can be a digital signal processor (DSP), an application specific integrated circuit (ASIC), programmable logic devices (PLDs), field programmable gate arrays (FPGAs), digitally enhanced circuits, or comparable device or a combination thereof. In some other embodiments according to the disclosure, the processing circuitry 1520 can be a central processing unit (CPU) configured to execute program instructions to perform various functions and processes described herein.

The apparatus 1500 can optionally include other components, such as input and output devices, additional or signal processing circuitry, and the like. Accordingly, the apparatus 1500 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for integrating sensing and communication, comprising:

receiving sensing-related information of a sensing task and communication-related information of a communication task;

determining, based on the sensing-related information and the communication-related information, frequency-related information, time-related information and one or more sensing signals; and sending the frequency-related information, time-related information and one or more sensing signals, for an apparatus to perform the sensing task and the communication task by applying carrier aggregation (CA) and secondary cell (SCell) dormancy behavior.

2. The method of claim 1, wherein the sensing-related information includes range resolution and a sensing schedule of the sensing task.

3. The method of claim 1, wherein the communication-related information includes a data rate of signals that the apparatus is capable of transmitting in the communication task.

4. The method of claim 1, wherein the frequency-related information includes a bandwidth, a number of component carriers (CCs), and identities of the CCs (CC IDs) on which the apparatus is capable of performing the sensing task and the communication task, and the time-related information includes an activation/deactivation schedule of one or more SCells including the CCs, and an active/dormancy behavior transition schedule of the SCells.

5. The method of claim 1, wherein the method further comprising: sending a media access control (MAC) control element (CE) to the apparatus for activating one or more SCells based on the frequency-related information.

6. The method of claim 1, further comprising: sending a downlink control information (DCI) to the apparatus for transferring an activated SCell from the dormancy behavior to an active behavior based on the time-related information.

7. The method of claim 1, wherein the one or more sensing signals includes at least one of a demodulation reference signal (DMRS), a synchronization signal block (SSB) signal, a channel state information reference signal (CSI-RS), a chirp signal, a sounding reference signal (SRS) and a random access channel (RACH) signal.

8. The method of claim 1, further comprising: sending a sensing report configuration to the apparatus to configure the apparatus to report a sensing result of the sensing task.

9. A method for integrating sensing and communication, comprising:

receiving frequency-related information, time-related information and one or more sensing signals that are determined bases on sensing-related information of a sensing task and communication-related information of a communication task, for an apparatus to perform the sensing task and the communication task by applying carrier aggregation (CA) and secondary cell (SCell) dormancy behavior;

activating and/or deactivating one or more SCells including one or more component carriers (CCs) based on the frequency-related information;

transitioning the activated SCell between a dormancy behavior and an active behavior based on the time-related information;

performing the sensing task by using the sensing signals on the activated SCell with the active behavior; and performing the communication task on a primary Cell (PCell) including a primary component carrier (PCC).

10. The method of claim 9, wherein the frequency-related information includes a bandwidth, a number of the CCs and the PCC, and identities of the CCs (CC IDs) on which the apparatus is capable of performing the sensing task and the communication task, and the time-related information includes an activation/deactivation schedule of the SCells.

11. The method of claim 10, wherein the time-related information further includes an active/dormancy behavior transition schedule of the SCells.

12. The method of claim 9, wherein the one or more sensing signals include at least one of a demodulation reference signal (DMRS), a synchronization signal block (SSB) signal, a channel state information reference signal (CSI-RS), a chirp signal, a sounding reference signal (SRS) and a random access channel (RACH) signal.

13. The method of claim 9, further comprising: receiving a media access control (MAC) control element (CE) for activating one or more SCells based on the frequency related information.

14. The method of claim 9, further comprising: receiving a downlink control information (DCI) for transferring an activated SCell from the dormancy behavior to an active behavior based on the time-related information.

15. The method of claim 9, further comprising:

receiving a sensing report configuration.

16. The method of claim 15, further comprising:

reporting a sensing result of the sensing task.

17. An apparatus, comprising circuitry configured to:

receive frequency-related information, time-related information and one or more sensing signals that are determined bases on sensing-related information of a sensing task and communication-related information of a communication task, for the apparatus to perform the sensing task and the communication task by applying carrier aggregation (CA) and secondary cell (SCell) dormancy behavior;

activate and/or deactivate one or more SCells including one or more component carriers (CCs) based on the frequency-related information;

transition the activated SCell between a dormancy behavior and an active behavior based on the time-related information;

perform the sensing task by using the sensing signals on the activated SCell with the active behavior; and perform the communication task on a primary Cell (PCell) including a primary component carrier (PCC).

18. The apparatus of claim 17, wherein the circuitry is further configured to:

receive a downlink control information (DCI) for transferring an activated SCell from the dormancy behavior to an active behavior based on the time-related information.

19. The apparatus of claim 17, wherein the circuitry is further configured to:

receive a sensing report configuration.

20. The apparatus of claim 19, wherein the circuitry is further configured to:

report a sensing result of the sensing task.

* * * * *